(12) United States Patent
Choi et al.

(10) Patent No.: US 9,457,325 B2
(45) Date of Patent: Oct. 4, 2016

(54) METHOD FOR FABRICATING POLYETHERSULFONE NANOFIBER MEMBRANE BY ELECTROSPINNING

(71) Applicant: Gwangju Institute of Science and Technology, Gwangju (KR)

(72) Inventors: Heechul Choi, Gwangju (KR); Hosik Park, Gwangju (KR); Jiyeol Bae, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 20 days.

(21) Appl. No.: 14/478,830

(22) Filed: Sep. 5, 2014

(65) Prior Publication Data

US 2015/0224453 A1 Aug. 13, 2015

(30) Foreign Application Priority Data

Feb. 12, 2014 (KR) .................. 10-2014-0016039

(51) Int. Cl.
*B01D 39/00* (2006.01)
*B01D 39/14* (2006.01)
*B29C 47/00* (2006.01)
(Continued)

(52) U.S. Cl.
CPC ........... *B01D 71/68* (2013.01); *B01D 67/0002* (2013.01); *D01D 5/0038* (2013.01); *D01F 6/76* (2013.01); *D04H 1/4282* (2013.01); *D04H 1/728* (2013.01); *B01D 2323/06* (2013.01); *B01D 2323/39* (2013.01); *D10B 2331/301* (2013.01)

(58) Field of Classification Search
CPC .............. B01D 71/82; B01D 2323/39; B01D 2325/40; B01D 71/68; B01D 2239/025; D01D 5/0038; D01D 5/0007; D01D 5/003; D01D 5/0092

USPC ..................... 210/500.41; 264/465
See application file for complete search history.

(56) References Cited

U.S. PATENT DOCUMENTS 5,340,480 A * 8/1994 Kawata ............. B01D 67/0011
                                                                210/500.23
8,268,224 B2 * 9/2012 Kohinata ............... C08G 65/40
                                                                264/465

(Continued)

FOREIGN PATENT DOCUMENTS

JP          2008308810         12/2008

OTHER PUBLICATIONS

Kyunghwan Yoon et al., Formation of functional polyethersulfone electrospun membrane for water purification by mixed solvent and oxidation processes, Jun. 19, 2009, pp. 2893-2899, vol. 50, Issue 19, Polymer.

*Primary Examiner* — Ana Fortuna
(74) *Attorney, Agent, or Firm* — Hauptman Ham, LLP

(57) ABSTRACT

Disclosed is a method for fabricating a polyethersulfone nanofiber membrane with improved mechanical strength for water treatment by electrospinning. According to exemplary embodiments, the polyethersulfone nanofiber membrane possesses higher mechanical strength than conventional polyethersulfone nanofiber membranes that are susceptible to damage and limited in life when applied to water treatment processes. In addition, the polyethersulfone nanofiber membrane has high water permeability and can remove contaminants with high efficiency compared to conventional membranes for water treatment. Therefore, the polyethersulfone nanofiber membrane is suitable for use in water treatment.

8 Claims, 7 Drawing Sheets

(51) Int. Cl.
  *H05B 7/00* (2006.01)
  *B01D 71/68* (2006.01)
  *D04H 1/728* (2012.01)
  *D01D 5/00* (2006.01)
  *D01F 6/76* (2006.01)
  *D04H 1/4282* (2012.01)
  *B01D 67/00* (2006.01)

(56) References Cited

U.S. PATENT DOCUMENTS

| | | | | |
|---|---|---|---|---|
| 8,916,619 B2* | 12/2014 | Sato | ................... | B01D 67/0016 521/183 |
| 2003/0224222 A1* | 12/2003 | Matsuoka | ........... | B29C 47/0021 428/704 |
| 2011/0194304 A1* | 8/2011 | Han | ..................... | D01D 5/0023 362/555 |
| 2013/0092622 A1* | 4/2013 | Kas | ........................ | B01D 69/12 210/489 |
| 2013/0101918 A1* | 4/2013 | Yandrasits | .......... | H01M 8/1023 429/482 |
| 2013/0105395 A1* | 5/2013 | McCutcheon | ....... | B01D 69/125 210/654 |
| 2013/0112618 A1* | 5/2013 | Diallo | ................... | B01D 71/76 210/641 |
| 2013/0213881 A1* | 8/2013 | Diallo | ...................... | D01F 1/10 210/500.23 |
| 2013/0280642 A1* | 10/2013 | Gummalla | ................ | C08J 5/22 429/492 |
| 2016/0001235 A1* | 1/2016 | Frisk | ..................... | B01D 71/68 210/650 |

* cited by examiner

METHOD FOR FABRICATING POLYETHERSULFONE NANOFIBER MEMBRANE BY ELECTROSPINNING

CROSS-REFERENCE TO RELATED APPLICATIONS

This application claims priority under 35 U.S.C. §119 to Korean Patent Application No. 10-2014-0016039 filed on Feb. 12, 2014 in the Korean Intellectual Property Office, the disclosure of which is incorporated herein by reference in its entirety.

BACKGROUND OF THE INVENTION

1. Field of the Invention

The present invention relates to a method for fabricating a polyethersulfone nanofiber membrane with improved mechanical strength for water treatment by electrospinning.

2. Description of the Related Art

The global water shortage crisis has become a serious global problem and the importance of water has become increasingly emphasized. Under these circumstances, the market for separation membranes as essential materials for the water industry is considered a very attractive market with an average growth rate of around 10% per annum and is expected to grow steadily from now on. In line with Korean government's strong policy to promote the water industry and the expanding global market for separation membranes, there has been rapidly growing interest in separation membranes in Korea. Nevertheless, frontier technologies and human resources for the development of separation membranes as essential materials for the water industry and related materials thereof are still unsatisfactory in Korea, thus failing to narrow the gap between Korea and advanced countries.

Fluorinated polymers, particularly, polyvinylidene fluoride (PVDF) and polytetrafluoroethylene (PTFE), sulfone polymers, such as polyethersulfone (PES) and polysulfone (PS), and polyolefin materials, such as polyethylene (PE) and polypropylene (PP), are typically used as polymeric materials for separation membranes. However, the conventional materials for water treatment are insufficient in strength and cause membrane fouling during long-term operation. This fouling requires physicochemical washing, which is a cause of a gradual decrease in the operating life of membranes. Further, the physicochemical washing reduces the porosity of membranes, impeding high-flux/low-energy operation of the membranes. In view of the foregoing, there is a need to develop an improved method for producing membrane materials that can overcome the physicochemical drawbacks of conventional materials, dramatically increase the water permeability of membranes, and provide a fundamental solution to the problems of membrane fouling. There is also a need to secure an economical method for fabricating membranes whose performance is enhanced by synthesizing new structures and an economical method for fabricating membranes using new raw materials.

Many approaches to solve the above problems have been proposed. Particularly, technologies associated with the development of materials for water treatment using electrospun nanofibers are considered the most important approaches.

Electrospinning is a technology that has been used to produce ultrafine microfibers using electricity. Electrospinning has the advantage of low investment cost in equipment and enables the production of various kinds of fibers, including low-denier fibers composed of not more than 10 polymer chains per cross-sectional area as well as general spun fibers with higher deniers. However, the application of filters based on electrospinning technology to environmental fields has been mostly focused on atmospheric applications, particularly, air filters for filtering dust and other impurities from air.

As discussed above, despite the recent rapid advances in technologies for fabricating water treatment materials using electrospun nanofibers, information about reliability and application technologies is still insufficient. The technologies are still limited in their application to environmental water treatment due to various reasons such as lack of technical feasibility and insufficient economic evaluation.

Thus, there is an urgent need for research on a method for producing electrospun nanofibers that have great potential as environmental filter materials and improved mechanical strength for water treatment applications.

SUMMARY OF THE INVENTION

It is an object of the present invention to provide a method for producing polyethersulfone nanofibers with improved mechanical strength as materials for membranes for water treatment, and a polyethersulfone nanofiber membrane fabricated by using the method.

According to one representative aspect of the present invention, a method for fabricating a polyethersulfone nanofiber membrane is provided which includes (1) adding polyethersulfone to N-methyl-2-pyrrolidone as a solvent to prepare a spinning solution, (2) electrospinning the spinning solution to produce nanofibers, and (3) washing and solidifying the nanofibers in distilled water, following by drying in air.

According to a further representative aspect of the present invention, there is provided a polyethersulfone nanofiber membrane fabricated by the method.

According to exemplary embodiments, the polyethersulfone nanofiber membrane of the present invention possesses higher mechanical strength than conventional polyethersulfone nanofiber membranes that are susceptible to damage and limited in life when applied to water treatment processes. In addition, the polyethersulfone nanofiber membrane of the present invention has high water permeability and can remove contaminants with high efficiency compared to conventional membranes for water treatment. Therefore, the polyethersulfone nanofiber membrane of the present invention is suitable for use in water treatment.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2a is a SEM image at a magnification of 2,000× of the polyethersulfone nanofiber membrane; FIG. 2b is a SEM image at a magnification of 250× of the polyethersulfone nanofiber membrane; and FIG. 2c is a SEM image at a magnification of 10,000× of the polyethersulfone nanofiber membrane, respectively;

DETAILED DESCRIPTION OF THE INVENTION

Figure 1:
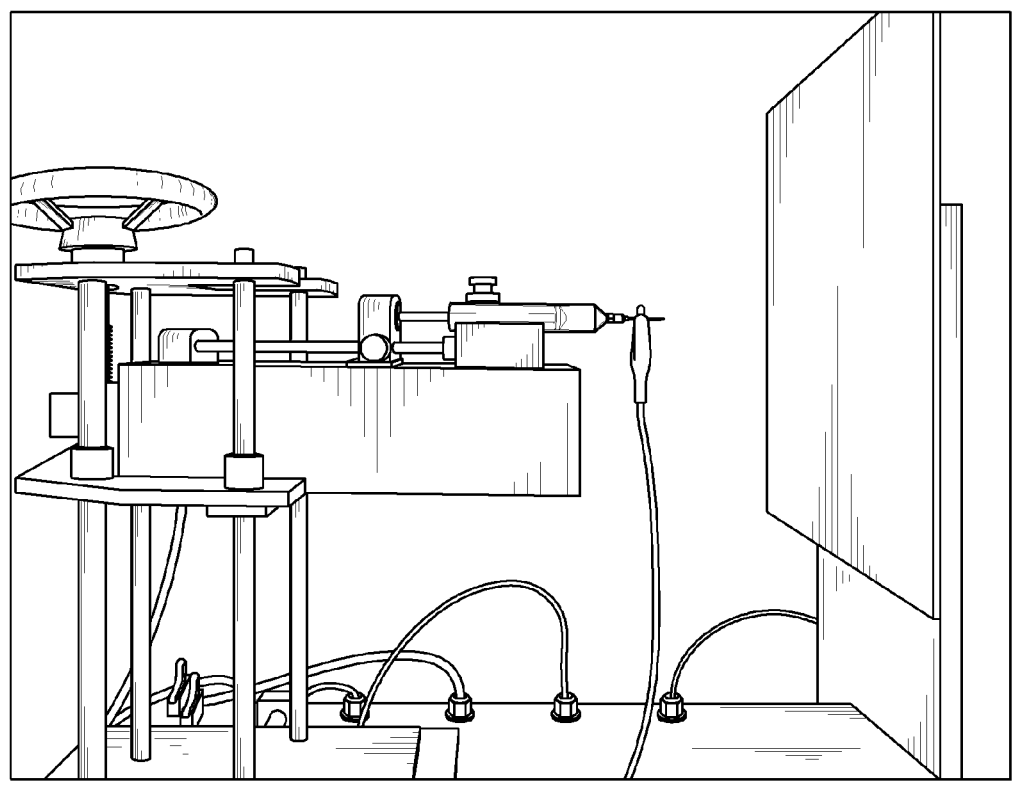
FIG. 1 shows an electrospinning system according to one embodiment of the present invention.

Several aspects and embodiments of the present invention will now be described in more detail.

According to one aspect of the present invention, a method for fabricating a polyethersulfone nanofiber membrane is disclosed which includes (1) adding polyethersulfone to N-methyl-2-pyrrolidone as a solvent to prepare a spinning solution, (2) electrospinning the spinning solution to produce nanofibers, and (3) washing and solidifying the nanofibers in distilled water, following by drying in air. In one embodiment of the present invention, the content of the polyethersulfone in the spinning solution is from 30 to 35% by weight, based on the weight of the N-methyl-2-pyrrolidone.

According to previous research results, N-methyl-2-pyrrolidone has a high viscosity than other solvents and is suitable to dissolve polyethersulfone due to its high solubility for polyethersulfone. However, N-methyl-2-pyrrolidone is difficult to apply to electrospinning due to its low volatility.

According to one embodiment of the present invention, high solubility of the N-methyl-2-pyrrolidone remaining unremoved after electrospinning for the production of polyethersulfone nanofibers is used to induce annealing of the polyethersulfone nanofibers, while taking advantage of low volatility of the N-methyl-2-pyrrolidone. This annealing enables the formation of a network of the polyethersulfone molecules, leading to an improvement in mechanical strength. After completion of the reaction, the N-methyl-2-pyrrolidone can be easily removed simply by washing with distilled water.

Particularly, the content of the polyethersulfone in the spinning solution is preferably from 30 to 35% by weight, based on the weight of the N-methyl-2-pyrrolidone. If the polyethersulfone is added in an amount of less than 30% by weight, nanofibers may not be formed or they may not have a uniform denier. Meanwhile, if the polyethersulfone is added in an amount exceeding 35% by weight, the spinning solution is too viscous, making it impossible to spin into fibers or resulting in the production of microscale fibers.

In a further embodiment of the present invention, the polyethersulfone has an average molecular weight of 62 g/mol to 64 g/mol.

The polyethersulfone may include polysulfone (PSU) or at least one polymer having a monomer consisting of an aryl group and a sulfur dioxide group, like polyethersulfone. However, there is no restriction on the kind of the additional polymer.

In another embodiment of the present invention, in step (2), the electrospinning is performed at a voltage of 8 to 13 kV.

According to one embodiment of the present invention, the polymer may not be sufficiently spun at a voltage lower than 8 kV and the spinning solution is spun in the form of a spray at a voltage exceeding 13 kV, making it impossible to form fibers and causing problems in terms of stability.

In a further embodiment of the present invention, in step (2), the spinning solution is discharged at a rate of 0.1 to 2 mL/hr.

According to one embodiment of the present invention, the number of nanofibers per unit area increases with increasing discharge rate of the spinning solution prepared in step (1). If the discharge rate is lower than 0.1 mL/hr, the spinning solution is not continuously discharged, making it impossible to produce uniformly sized nanofibers. Meanwhile, if the discharge rate exceeds 2 mL/hr, a portion of the spinning solution discharged is not collected in a collector, resulting in low productivity.

In another embodiment of the present invention, in step (2), the spinning distance is from 10 to 25 cm.

According to one embodiment of the present invention, the diameter of fibers decreases with increasing spinning distance of the spinning solution prepared in step (1). If the spinning distance is less than 10 cm, the scattering time of the spinning solution is short, resulting in the formation of microscale fibers. Meanwhile, if the spinning distance exceeds 25 cm, the uniformity of nanofibers may deteriorate.

In a further embodiment of the present invention, in step (2), the electrospinning is performed at a temperature of 20 to 30° C.

According to one embodiment of the present invention, the formation of nanofibers is determined by the spinning temperature. If the spinning solution prepared in step (1) is electrospun at a temperature outside the range defined above, particularly, at a temperature lower than 20° C., nanofibers may not be formed. Meanwhile, if the electrospinning is performed at a temperature exceeding 30° C., the solvent may be completely volatilized, resulting in low strength of the final fiber membrane. Further, the high temperature is unsuitable in terms of energy efficiency.

In step (3), the nanofibers obtained in step (2) are immersed in distilled water. By the water immersion, the remaining N-methyl-2-pyrrolidone can be completely removed, and simultaneously, the polyethersulfone nanofibers can be solidified. The solidification is performed in a DI water bath. The immersion time is preferably in the range of 30 minutes to 1 hour but is not limited to this range.

According to a further aspect of the present invention, a polyethersulfone nanofiber membrane fabricated by the method is disclosed.

According to one embodiment of the present invention, the polyethersulfone nanofiber membrane is advantageous in terms of Young's modulus and tensile strength compared conventional membranes, has a high pure water flux, and can remove contaminants with high efficiency, thus being suitable for use in water treatment applications.

In one embodiment of the present invention, the nanofiber membrane has a thickness of 200 to 500 nm.

The present invention will be explained in more detail with reference to the following examples. However, these examples are not to be construed as limiting or restricting the scope and disclosure of the invention. It is to be understood that based on the teachings of the present invention including the following examples, those skilled in the art can readily practice other embodiments of the present invention whose experimental results are not explicitly presented.

Example 1

An electrospun polyethersulfone nanofiber membrane for water treatment was fabricated using an electrospinning system (see FIG. 1) by the following procedure.

First, polyethersulfone was dissolved in N-methyl-2-pyrrolidone (NMP) to prepare a spinning solution. The polyethersulfone was used in an amount of 30% by weight, based on the weight of the NMP. The spinning solution was spun through a metering pump and a syringe installed in the electrospinning system and was allowed to scatter in a state in which an electric field was applied by a high-voltage generator, to form solidified fibers. The solidified fibers were collected in a collector to fabricate an assemblies of polyethersulfone nanofibers.

Then, the polyethersulfone nanofibers were perfectly solidified by immersing in distilled water at room temperature and dried in air to fabricate a polyethersulfone nanofiber membrane.

The applied voltage, the discharge rate and spinning distance of the spinning solution, and the spinning temperature are shown in Table 1.

TABLE 1

| | |
|---|---|
| Applied voltage (kV) | 13 |
| Discharge rate (mL/hr) | 0.5 |
| Spinning distance (cm) | 25 |
| Temperature (° C.) | 25-30 |

Comparative Example 1

A polyethersulfone nanofiber membrane was fabricated in the same manner as in Example 1, except that the amount of the polyethersulfone added was changed from 30 wt % to 25 wt %.

Comparative Example 2

A polyethersulfone nanofiber membrane was fabricated in the same manner as in Example 1, except that the amount of the polyethersulfone added was changed from 30 wt % to 40 wt %.

Comparative Example 3

A polyethersulfone nanofiber membrane was fabricated in the same manner as in Example 1, except that dimethylformamide (DMF) was used instead of N-methyl-2-pyrrolidone.

Experimental Example 1

The surfaces of the polyethersulfone nanofiber membranes fabricated using polyethersulfone at different concentrations in Example 1 and Comparative Examples 1-2 were analyzed using a scanning electron microscope (S-4700, U.S.A.), and the results are shown in FIGS. 2a to 2c, 3, and 4, respectively.

Figure 2A:
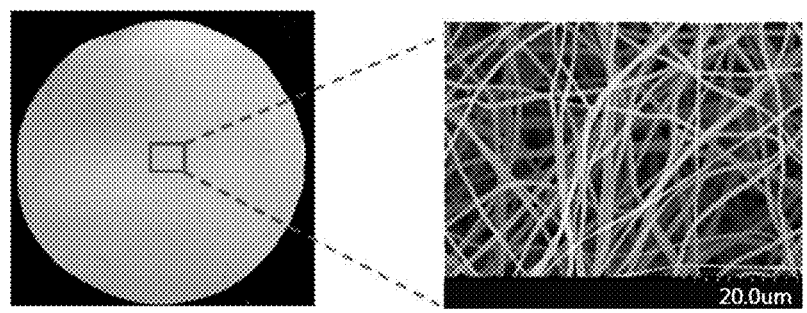
FIGS. 2a to 2c show SEM images of a nanofiber membrane according to one embodiment of the present invention, which was fabricated using a spinning solution containing 30% by weight of polyethersulfone.
Figure 2B:
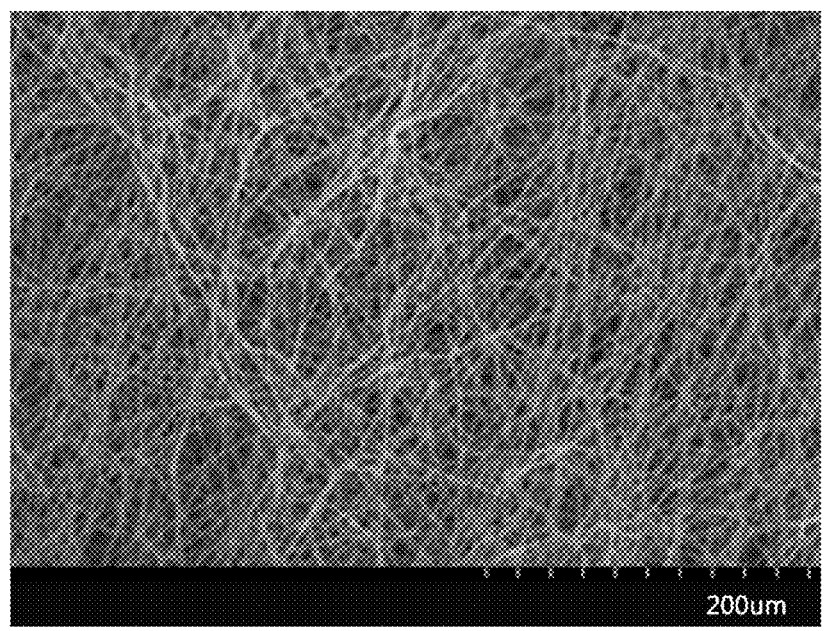
Figure 2C:
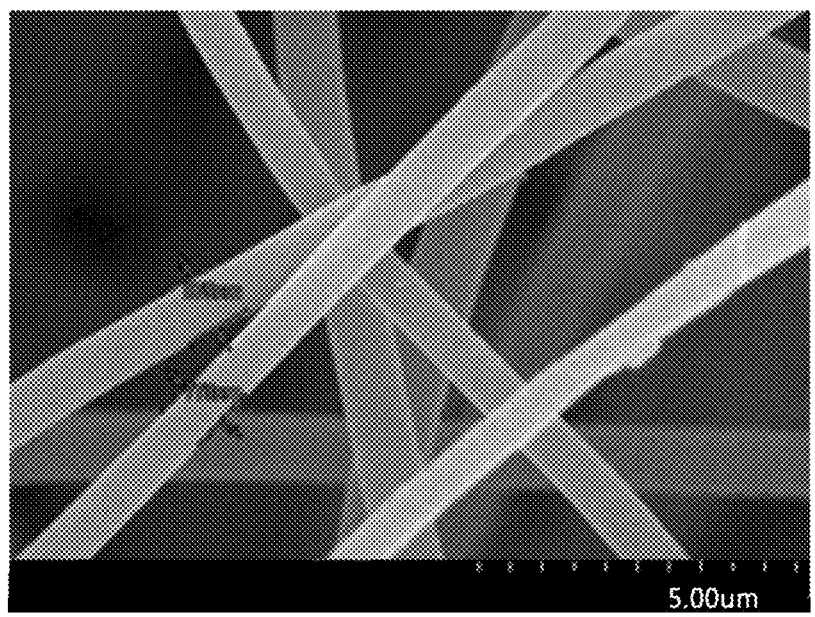

As shown in FIGS. 2a to 2c, the polyethersulfone nanofiber membrane of Example 1 was composed of the uniform nanofiber aggregate having an average diameter of 600-700 nm.

Figure 3:
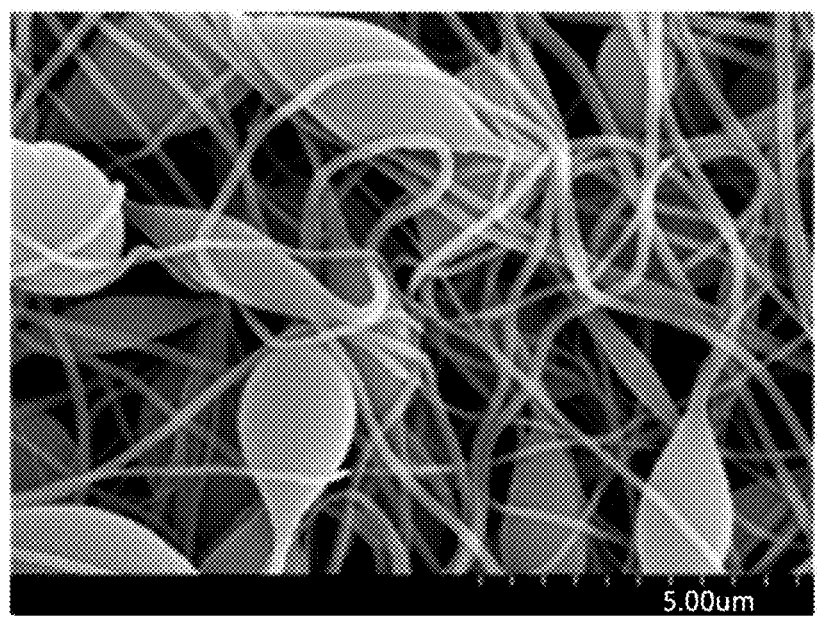
FIG. 3 is a SEM image of a nanofiber membrane fabricated using a spinning solution containing 25% by weight of polyethersulfone in Comparative Example 1.

As shown in FIG. 3, polyethersulfone beads were formed in the polyethersulfone nanofiber membrane of Comparative Example 1, indicating that the denier of the nanofibers was not uniform. This result is believed to be because the viscosity of the solution was not suitable for electrospinning.

Figure 4:
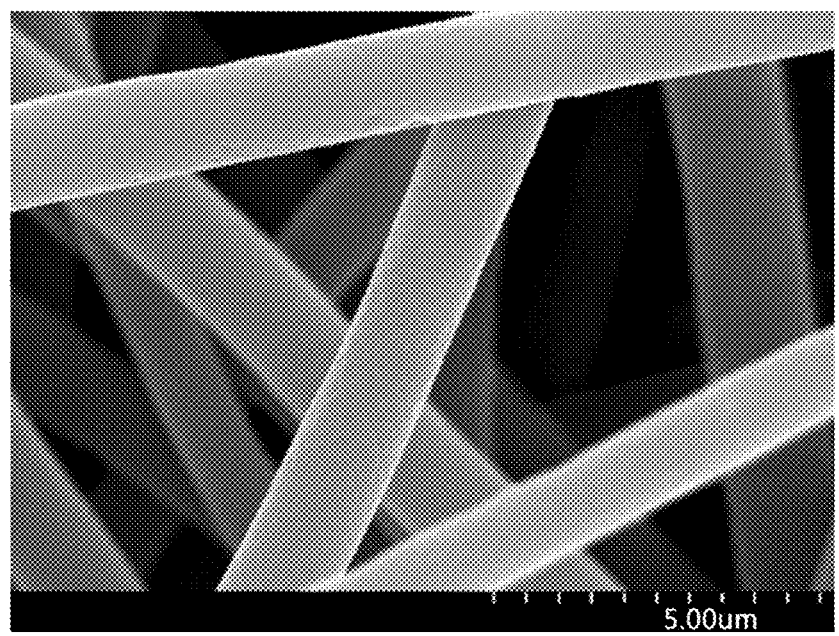
FIG. 4 is a SEM image of a nanofiber membrane fabricated using a spinning solution containing 40% by weight of polyethersulfone in Comparative Example 2.

As shown in FIG. 4, thick microscale nanofibers unsuitable as filter materials for water treatment were synthesized in the polyethersulfone nanofiber membrane of Comparative Example 2. This result is believed to be due to high viscosity of the spinning solution.

Experimental Example 2

The mechanical strengths of the polyethersulfone nanofiber membranes were analyzed using a tensile/load tester (PT-200N, Japan). Table 2 shows the mechanical strengths of the nanofibers fabricated in Example 1 and Comparative Example 3.

TABLE 2

Comparison of the mechanical strengths of the polyethersulfone nanofiber membranes

| | Modulus of elasticity for tensile loading (Young's modulus) (MPa) | Tensile strength (MPa) |
|---|---|---|
| Example 1 (using NMP) | 12,000 | 6 |
| Comparative Example 3 (using DMF) | 50 | 1.7 |

As shown in Table 2, the polyethersulfone nanofiber membrane of Example 1 showed a modulus of elasticity about 200 times and a tensile strength about 4 times higher than those of the membrane of Comparative Example 3, which was fabricated using dimethylformamide as a solvent. These results indicate that the possibility of damage to the polyethersulfone nanofiber membrane of Example 1 is reduced when the polyethersulfone nanofiber membrane is applied to water treatment. Therefore, the polyethersulfone nanofiber membrane of Example 1 is expected to be useful for water treatment.

Figure 5:
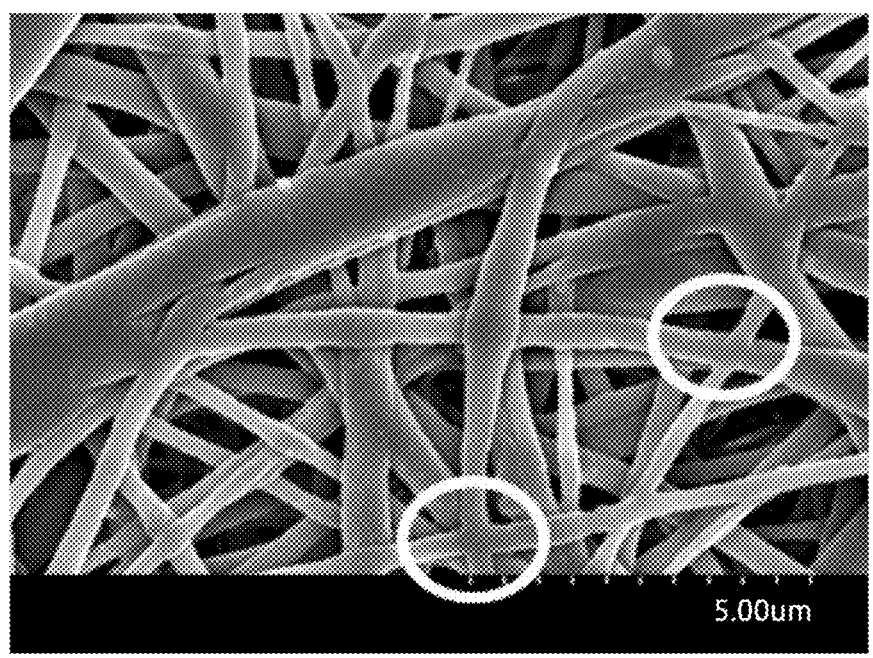
FIG. 5 is a SEM image showing annealed portions of a polyethersulfone nanofiber membrane according to one embodiment of the present invention.

The reason for the better mechanical properties of the polyethersulfone nanofiber membrane of Example 1 is believed to be because less volatile N-methyl-2-pyrrolidone is not completely removed, remains on the fiber surface, and re-dissolve the fibers, causing annealing between the individual fibers to form cross-junctions between the fibers, as shown in FIG. 5.

Experimental Example 3

The water permeability and contaminant removal efficiency of the polyethersulfone nanofiber membrane of Example 1 were analyzed and compared with those of a commercial microfiltration membrane and a commercial ultrafiltration membrane.

A polyvinylidene fluoride membrane (Synder membrane technology, China) having 0.2 μm pores was used as the commercial microfiltration membrane. A polyethersulfone membrane (Synder membrane technology, China) having a molecular weight cut-off of 300,000 Da was used as the commercial ultrafiltration membrane.

The filtration performance of the membranes was evaluated using a dead-end cell unit equipped with a nitrogen gas tank for pressure regulation. Experiments were conducted while maintaining a constant pressure of 1 bar. A turbid solution with turbidity of 100 NTU was prepared in accordance with test methods for microfiltration membrane modules and ultrafiltration membrane modules for tab water and was used as feed water for contaminant removal experiments. Kaolin (Sigma-Aldrich) was used as turbidity causing matter. The results are shown in Table 3.

TABLE 3

Evaluation of water permeabilities and turbidity causing matter filtration performance of the polyethersulfone nanofiber membrane of Example 1 and the commercial membranes

| Filter | Water permeability (Lmh/bar) | Effluent water turbidity (NTU) |
|---|---|---|
| Example 1 | 80,000 | 0.00 |
| Microfiltration membrane | 24,000 | 0.45 |
| Ultrafiltration membrane | 3,300 | 1.15 |

As can be seen from the results in Table 3, the water permeability of the polyethersulfone nanofiber membrane of Example 1 was about 3 times higher than that of the commercial microfiltration membrane and about 24 times higher than that of the commercial ultrafiltration membrane.

In addition, the polyethersulfone nanofiber membrane of Example 1 was confirmed to remove the turbidity causing matter with higher efficiency. These results are believed to be because the polyethersulfone nanofiber membrane of Example 1 has a higher porosity and a denser nanofiber structure in view of its structural characteristics.

What is claimed is:

1. A method for fabricating a polyethersulfone nanofiber membrane, comprising:
    adding polyethersulfone to N-methyl-2-pyrrolidone as a solvent to prepare a spinning solution;
    electrospinning the spinning solution to produce nanofibers; and
    washing and solidifying the nanofibers in distilled water, following by drying in air,
    wherein the content of the polyethersulfone in the spinning solution is from 30 to 35% by weight, based on the weight of the N-methyl-2-pyrrolidone, wherein the fibers water permeability is 80,000 Lmh/bar or more.

2. The method according to claim 1, wherein the polyethersulfone has an average molecular weight of 62 g/mol to 64 g/mol.

3. The method according to claim 1, wherein, in step (2), the electrospinning is performed at a voltage of 8 to 13 kV.

4. The method according to claim 1, wherein, in step (2), the spinning solution is discharged at a rate of 0.1 to 2 mL/hr.

5. The method according to claim 1, wherein, in step (2), the spinning distance is from 10 to 25 cm.

6. The method according to claim 1, wherein, in step (2), the electrospinning is performed at a temperature of 20 to 30° C.

7. A polyethersulfone nanofiber membrane fabricated by the method according to claim 1.

8. The polyethersulfone nanofiber membrane according to claim 7, wherein the nanofiber membrane has a thickness of 200 to 500 nm.

* * * * *